June 24, 1930.  A. L. MILLER ET AL  1,767,089
METHOD FOR DEALING WITH PARTICLES IN GASEOUS SUSPENSION
Filed April 30, 1925   2 Sheets-Sheet 1
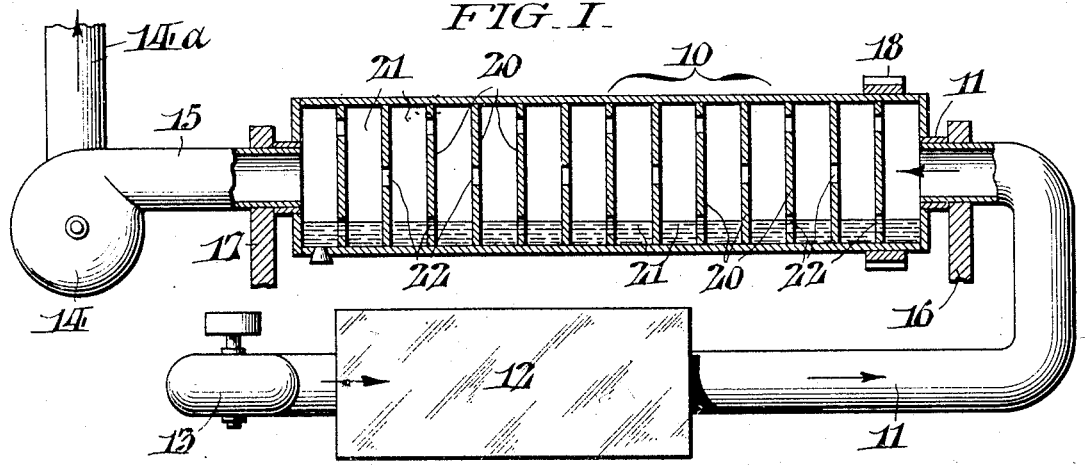
FIG. I.
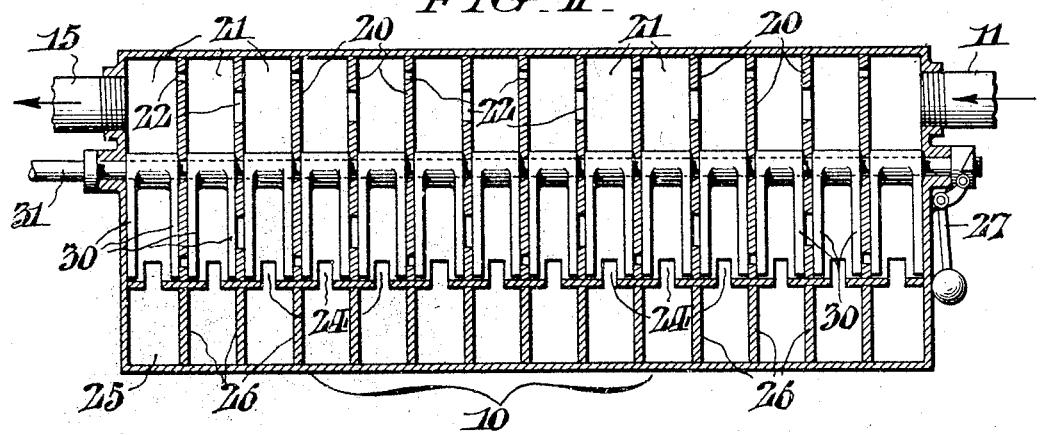
FIG. II.
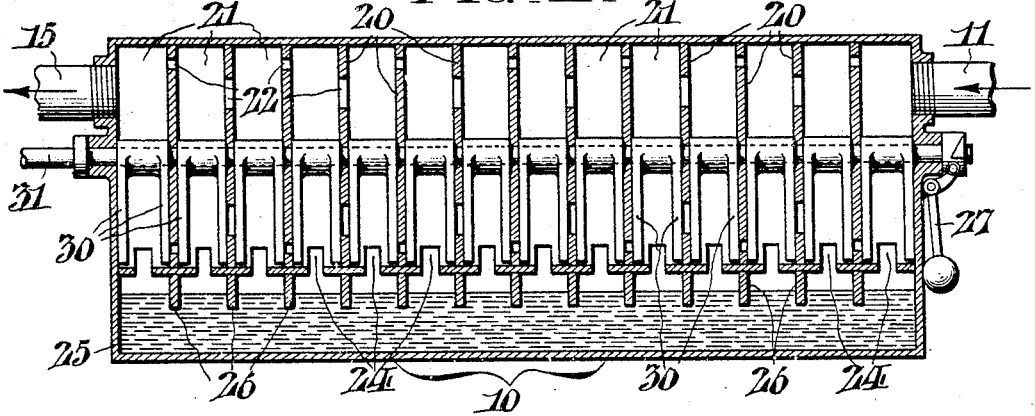
FIG. III.
WITNESSES
John E. Bergner
Alfred E. Ischinger
INVENTORS:
Amos L. Miller &
Henry J. Masson,
BY Fraley & Paul
ATTORNEYS.

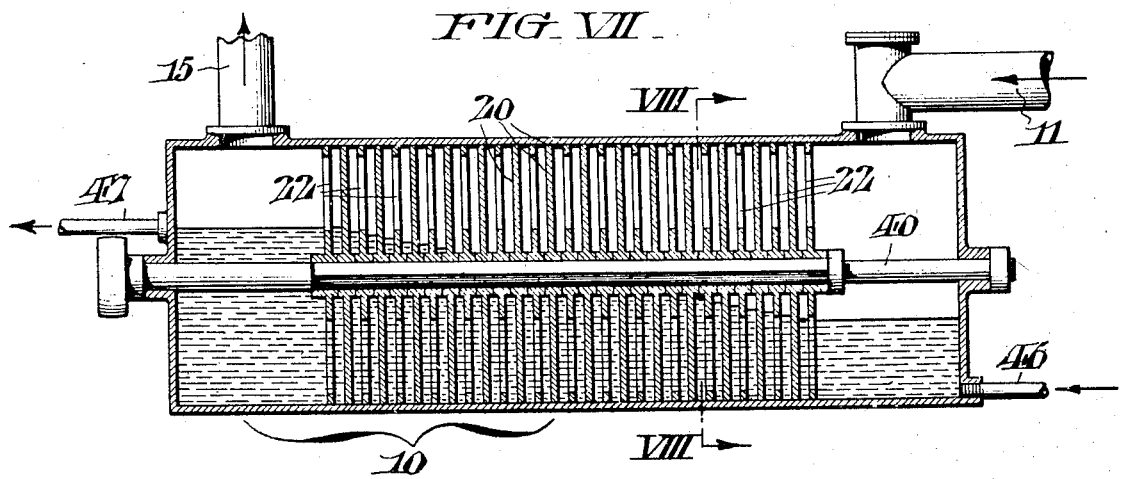
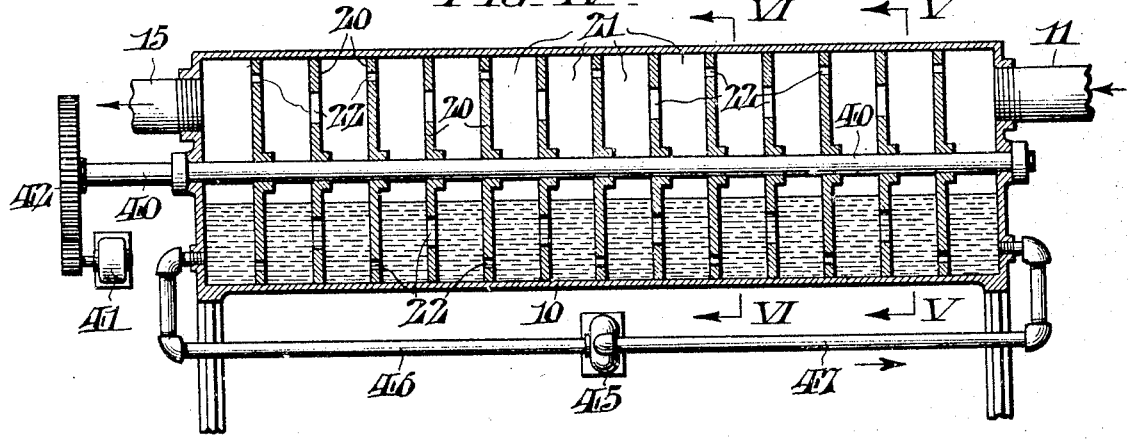
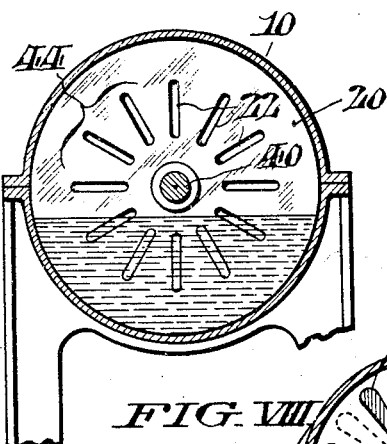
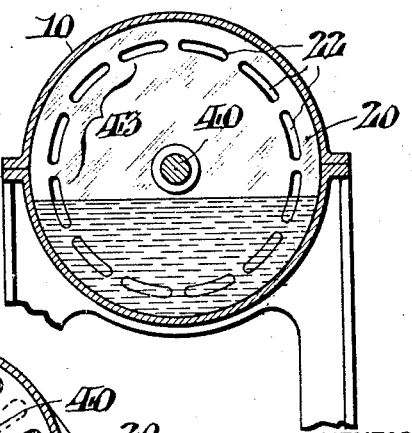
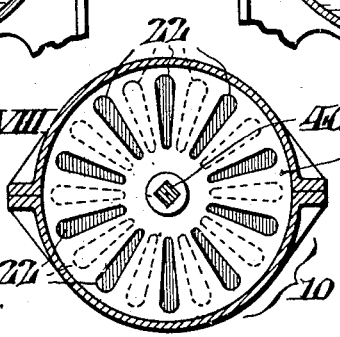

Patented June 24, 1930

1,767,089

UNITED STATES PATENT OFFICE

AMOS L. MILLER, OF PHILADELPHIA, PENNSYLVANIA, AND HENRY J. MASSON, OF NEW YORK, N. Y.

METHOD FOR DEALING WITH PARTICLES IN GASEOUS SUSPENSION

Application filed April 30, 1925. Serial No. 26,854.

Our invention relates to methods and apparatus for dealing with particles in gaseous suspension, including both the segregation of such particles from the medium in which they are suspended, and their utilization. The invention is particularly adapted to the manufacture of finely divided carbon and of ink, and we have hereinafter explained it with special reference thereto. Our invention affords the advantage of a more or less direct transfer of loose particles of finely powdered pigment from gaseous suspension (the nascent condition of lampblack in various processes of manufacture) into incorporation with a liquid base to form liquid color, such as ink, without necessity for collecting and handling the dry pigment as such and subsequently incorporating it with liquid as a separate operation,—which latter usually involves a tedious and costly grinding process. However, the invention is also useful as a means of collecting loose particles dry, as a powder, for subsequent use or disposal in any way desired. In such cases, it affords the advantage of allowing a very fine product to be secured and of avoiding contamination of the product with sand, grit, or other extraneous impurity.

Our present application is a continuation of our pending applications, Serial Nos. 597,861 and 597,862, filed October 30, 1922, as to common subject-matter disclosed and claimed.

In the drawings, Fig. I is a diagrammatic view of an apparatus or plant for producing lampblack and collecting it and incorporating it with a liquid base,—the collecting apparatus being shown in vertical longitudinal section.

Fig. II is a similar view of a collector alone, with provisions adapting it to dry collection.

Fig. III shows a collector resembling that shown in Fig. II, but adapted for wet collection.

Fig. IV shows a different form of collector, again in vertical longitudinal section.

Figs. V and VI show transverse sections through the collector shown in Fig. IV, taken as indicated by the lines V—V and VI—VI in Fig. IV.

Fig. VII shows a vertical longitudinal section through yet another form of collector.

Fig. VIII shows a transverse section through the same collector, taken as indicated by the lines VIII—VIII in Fig. VII.

Fig. I shows apparatus 10 suitable for the purpose of our invention, connected by a conduit 11 to a source or means 12 for supplying finely divided material in a state of gaseous suspension. The apparatus 12 may consist, for example, of any suitable means of producing lampblack, as by partial combustion and decomposition of hydro-carbons like fuel oil or natural gas. Thus the collection of the particles at 10 from suspension in the air and in other products of combustion proceeds as an immediate continuation of their evolution in that state at 12.

In Fig. I, means for producing pressure or draft to cause a flow for aerating or gaseously suspending the light solid particles are diagrammatically represented by a blower 13 delivering air for combustion of the fuel to the lampblack apparatus 12 and by an exhauster 14 with its intake conduit 15 connected to the apparatus 10, so as to draw the gases through the apparatus 10 and discharge them, substantially freed of lampblack, at 14ª. However, it will be understood that one or both of the devices 13, 14 may be dispensed with, and the flow necessary for floating suspension of the fine particles produced in any other suitable way. In the apparatus 10, the fine particles may be segregated from the gas and either incorporated with a liquid base to form liquid color or ink, as in Fig. I, or simply collected dry, as in Fig. II. In the types of apparatus here illustrated (and the like is true of those shown in Figs. III–VIII), segregation from the gas is initially effected by deposition of the lampblack on a receptive surface, whence it may be removed by suitable means or treatment, etc., according to the ultimate disposition to be made of it. Inasmuch as only relatively fine or impalpable particles can be floatingly suspended in air or other gas of moderate velocity, a system such as we have shown and described offers a means of segregating such fine particles from coarser ones, as well as from gas in which they are suspended.

In the types of apparatus here illustrated, initial segregation or collection is effected by impact of the solid particles at high velocity against an interposed surface, and their consequent adherence thereto, notwithstanding the reflection or repulsion of the gas in which they are suspended. The proportion of the impinging material thus adhering will depend on a variety of factors, such as the nature and velocity of the particles; the nature and condition of the surface, whether smooth or rough, wet or dry, and if the former, on the character of the liquid film on it; and, in practice, on the distance of the receptive surface from the orifice whence the stream of gas issues. The degree or strength of adhesion of the particles to one another and to the surface may also depend on the nature of the particles, as well as on the nature and condition of the surface; but in general it will be so small as to permit easy removal of the loose fine particles in various ways. Where the receptive surface is wet, the deposit can advantageously be removed or washed from it by means of the same liquid. Water may suffice for such purposes in some cases; in others, a more sticky or viscous liquid may prove desirable. Oil such as commonly used for the "base" of printer's ink is sufficiently viscous, and otherwise quite suitable; and by its employment ink of any desired degree of concentration may be produced directly in the apparatus 10, without necessity for subsequent grinding or other treatment. Where liquid is present in the collector 10, the products of combustion may require to be cooled somewhat on their way to the collector, to obviate excessive evaporation of the liquid. Such cooling may be effected by radiation from the conduit 11, when of suitable length and exposed surface. Even when there is no liquid in the collector 10, cooling of the gases may still be desirable, as a precaution against the gases taking fire if air should come in contact with them.

The apparatus 10 shown in Fig. I comprises an elongated closed casing or drum rotatably mounted about the axially located supply and discharge connections 11 and 15 at its opposite ends, between bearing supports diagrammatically represented at 16, 17. Driving means for rotating the apparatus 10 is diagrammatically represented by the gear at 18. Within the casing are a number of transverse plates or disc members 20 adapted to repel the gas and to afford receptive surfaces for the impinging particles, and also dividing the interior of the casing into a series of chambers or cells 21. The plates 20 have apertures 22 so arranged that those in each plate lie opposite unapertured portions of adjacent plates. In the present instance, the plates 20 are quite solid or impervious except at the holes 22.

In operation, the laden gas stream from the conduit 11 may be directed against an unapertured portion of the first plate 20 with sufficient velocity to deposit some of its charge, by virtue of the relatively great mass and momentum of the solid particles as compared with gas at the same velocity. In other words, when the velocity of the laden gas stream or jet is sufficient, not only do the solid particles resist deflection with the gas in its passage from one hole 22 to the next, but the high velocity of impingement helps them to stick to the surfaces at 20. Owing to its effective pressure (due to the blower 13 and the exhauster 14, or the like), the still partially laden gas in the first cell 21 issues through the restricted openings 22 in the corresponding plate 20 in streams or jets of high velocity, (fully equalling or even surpassing that of the initial current from the conduit 11); and these jets are similarly directed against unapertured portions of the next plate 20, so as to deposit thereon a portion of the solid particles still in suspension in the gas. This action is repeated, at correspondingly lower and lower pressure, for each succeeding chamber 21 and plate 20,—until the gas finally issues at 15 nearly or substantially free of solid particles. In other words, the gas is alternately and repeatedly passed through the restricted orifices 22 into regions of continually lower and lower pressure and jetted against the receptive surfaces 20; and thus its pressure is fractionally and progressively converted into velocity, and its solid particles collected. Difficulty from increase in the volume of gas to be dealt with owing to the decrease in pressure from one set of orifices 22 to the next is largely obviated by a compensatory reduction in volume resulting from progressive cooling of the gas during its passage through the collector. Hence the total effective areas of the orifices 22 in the successive plates 20 can readily be proportioned to secure the action described.

The best velocity in a given case can be determined by varying the velocity and observing that at which the gases discharged from the collector are clearest. In general, velocities of some 1,000 to 4,000 ft. per minute for the gases at the holes 22 are suitable. As a rule, increasing the velocity increases the efficiency or percentage of recovery: e. g., a velocity of 4,000 ft. per minute gives about 90% recovery, which is some 10% greater than given by one of 1,000 ft. per minute. Such greater recovery is well worth the cost of securing the slightly greater pressure needed to give the higher velocity.

Collection of the fine particles on a wet surface lends itself especially to direct incorporation of the particles in a liquid. For this purpose, the apparatus 10 may be partially filled with the liquid and rotated by the driving means 18, so as to keep the emergent portions of the plates 20 wet with continually renewed films of the liquid and to continually wash off the loose solid particles sticking to the plates, by the passage of the plates through the main body of liquid. In this way, ink (e. g., printer's ink) of any desired concentration and consistency can be produced, according to the duration of the "run" and the quantity of oil treated at a time. For the rotation of the apparatus 10, a speed of 30–40 R. P. M. is suitable. The higher speed appears to favor smoothness of the ink.

Fig. II illustrates the adaptation of the apparatus 10 to collection of particles dry. As here shown, the bottom of the casing (which need not revolve) is slotted with openings 24 to permit the collected material to fall into a hopper or receptacle 25 beneath, which is partitioned transversely at 26 to prevent short-circuiting of the gases through it. When the particles are thus collected dry, they may be allowed to accumulate on the plates 20 until the weight of the accumulation overcomes its adhesion or cohesion and causes it to break off and fall to the bottom of the casing. Or the apparatus 10 may be rotated, or jarred or vibrated, to dislodge the accumulation,—as by means of a periodic striker 27. Or, again, scrapers 30 on a revolving shaft 31 may be employed to dislodge the deposits.

In some cases, it may be desired to incorporate the fine particles directly in a liquid without, however, wetting the plates 20. For this purpose, the apparatus shown in Fig. III may be employed,—similar to that of Fig. II, but with a bath of liquid in the receptacle 25 into which the accumulation drops from the plates 20. This, it will be seen, virtually avoids contact of the gases in which the particles are suspended with the liquid (e. g., oil base for printer's ink) to which they are to be transferred.

In Figs. III and IV, various parts and features are marked with the same reference characters as in preceding figures, as a means of dispensing with merely repetitive description.

Figs. IV–VI illustrate a somewhat different form of apparatus, in which the discs 20 revolve with the shaft 40 (shown as driven by an electric motor 41 through reduction gearing 42), while the casing 10 remains stationary. As shown, the supply and discharge connections 11 and 15 are eccentric to the axis of the casing 10, opening into its upper region. As indicated by Figs. V and VI, the apertures 22 may be differently arranged in alternate discs 20: i. e., for the first, third, etc. from the inlet end of the casing, they are arranged in an annular series 43 near the periphery of the disc; while for the second, fourth, etc., they are arranged in a circular group 44 in its central portion. In the present instance, the openings 22 have the form of narrow slots,— those in the series 43 extending annularly, and those in the group 44 radially. Though loose enough to revolve freely in the casing 10, the discs 20 fit its interior snugly enough to compel the gases to pass through the apertures 22. Each of these discs 20 may contain the same number of openings 22, of the same aggregate area.

When the casing 10 contains a liquid, its level may approximate the shaft 40, as shown, so that all the apertures 22 may be completely submerged at each revolution of the discs; but the casing should not be more than about half full, so that sufficient deposit-receiving surface may be exposed. As before, the rate of rotation of the discs may be some 30–40 R. P. M. The liquid (e. g., oil base for printer's ink) may be circulated through the lower portion of the casing 10, as by a pump 45 in a line of piping 46, 47 connecting opposite ends of the casing, as illustrated in Fig. IV. Such circulation not only assures an initially homogeneous mixture of liquid and lampblack, but also tends to keep the disc-openings 22 free and clear.

Figs. VII and VIII illustrate a collector of very simple construction that has given highly satisfactory results. It closely resembles that shown in Figs. IV–VI, consisting of a cylindrical metal casing or shell 7 ft. 6 in. long and of 30 in. internal diameter, with a central longitudinal shaft 40 (square in cross-section) carrying the rotating apertured discs 20. As shown, these discs 20 occupy only the central region (about 4 ft. 6 in. in length) of the casing, and the supply and discharge conduits 11 and 15 open laterally (at the top) into the clear spaces at the ends. There are 32 of these discs 20, spaced about 1½" apart, and each pierced with ten napiform radial slots 22, aggregating about 150 sq. in. in cross-sectional area. The discs 20 are arranged with their slots 22 staggered as between adjacent discs, so that a solid part of each disc lies opposite the holes in its neighbors. As shown, the casing is about half-full of oil, which may be pumped in (from a tank as in Fig. IV) through an inlet 46 near the casing bottom at the same end as the gas supply 11, and may be discharged (returning to the tank) through an overflow 47 at the same end as the discharge 15, some 5" above the axis of the collector casing. Lampblack laden gases may be passed through this collector with a velocity of about 4,000 ft. per min. at the holes 22, entering at 11 with a temperature say of about 800° F., and leaving at 15 with a temperature of about 300° F. Under such conditions, the oil will stand about 5 in. below the casing axis at the inlet end: i. e., there will be a difference of 10 in. in the oil levels at opposite ends of the casing. Owing to the variant oil level and the cooling of the gases, their velocity through the holes 22 will be approximately or substantially uniform throughout the length of the tank. The oil in the collector may have a temperature of about 200° F. to 250° F.

The feathery, flocculent character of lampblack from petroleum oils makes our methods as described above especially suitable for its collection, inasmuch as the feathery particles tend to aggregate or cling loosely together as soon as they come together by inpingement on the collecting surface. The loose particles of lampblack from natural gas or other carbonaceous gas (specifically distinguished as "gas-black") are also collectible by our process to very good advantage. Either kind of black gathers and is retained on the collecting surfaces in a loose, porous film that mixes smoothly, easily with the oil in the collector, so that the ink (as already noted) can be used directly as it comes from the collector, without grinding.

From the foregoing it will be seen that the collection of lampblack from the gaseous products of the incomplete combustion of carbonaceous matter beyond the zone of combustion or reaction in loose, friable deposits, as described, is a very different matter from building up a mass of solid carbon or coke by playing a burning blast of carbonaceous fuel on a refractory surface, or from playing a burning carbonaceous flame on an oil or aqueous surface or film, so as to chill the flame and charge the liquid with the resulting carbonaceous products. The impingement of the laden gas at velocity against a receiving surface as described is likewise a very different matter from the mere circulation (at very much lower rates of flow, such as 60 ft. per minute, for example) of laden gas through sedimentation or collection chambers or filtering types of apparatus, where momentum plays no such part in the collection.

Having thus described our invention, we claim:

1. The method of collecting lampblack evolved by combustion which comprises passing the products of combustion, under pressure, through restricted orifices, to impart to them velocity sufficient to enable the particles to resist deflection with the medium in which they are floating, and directing them against receptive surfaces to cause impingement and adhesion of the lampblack thereon.

2. The method of collecting solid particles of lampblack from suspension in gas under pressure, which comprises alternately and repeatedly passing the laden gas, the solid particles of which consist of lampblack, through restricted orifices into a region of lower pressure and directing the resultant jet against receptive surfaces, thus fractionally and progressively converting the pressure of the gas into velocity and collecting the solid particles by impingement and adhesion resulting from their momentum.

3. The method of collecting solid particles of lampblack from gaseous suspension which comprises directing a stream of the laden gas, the solid particles of which consist of lampblack, at high velocity against receptive apertured surfaces moistened with a viscous substance.

4. The method of producing a smooth mixture of fine particles of lampblack with a liquid which comprises suspending the fine particles in a gas stream; directing the stream against interposed apertured surfaces at such high velocity sufficient as to enable the particles to resist deflection with the medium in which they are floating, to cause the particles to impinge and adhere on the apertured surfaces and treating the charged apertured surfaces with the liquid to remove the loose deposit and incorporate its particles in the liquid.

5. The method of collecting solid particles of lampblack from gaseous suspension and incorporating them in a liquid base which comprises jetting the laden gas at high velocity against repellent and receptive apertured surfaces revolving partially immersed in a bath of the liquid base.

In testimony whereof, we have hereunto signed our names at New York, N. Y. this first day of April, 1925.

AMOS L. MILLER.
HENRY J. MASSON.